Figure 1:
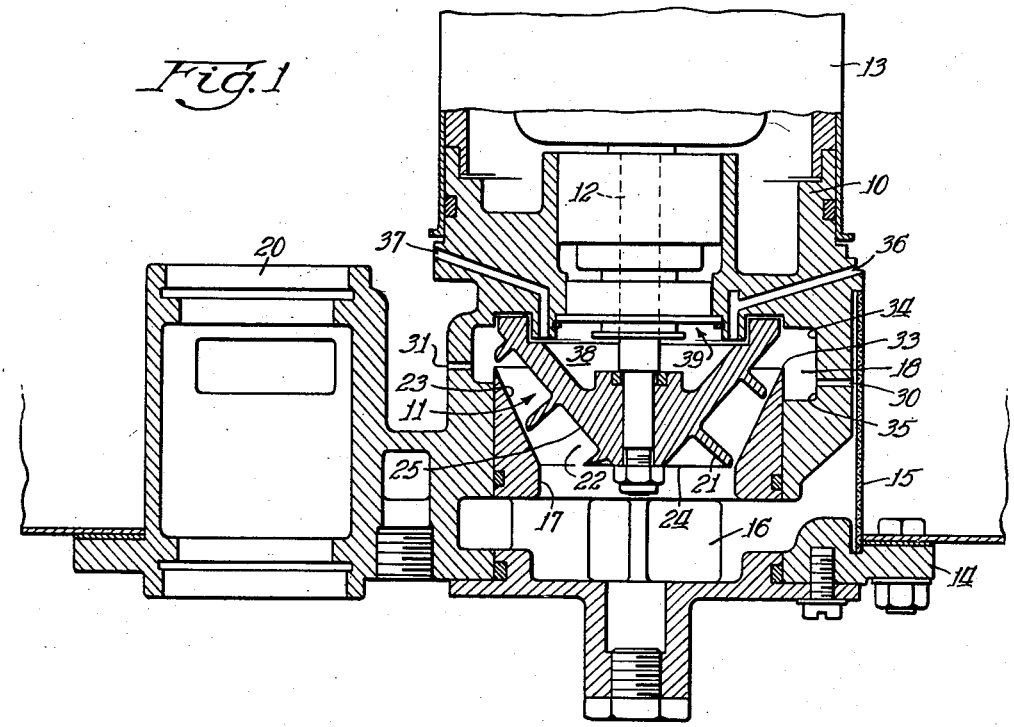

Aug. 5, 1958     T. LOCK     2,845,870
FUEL BOOSTER PUMP

Filed April 22, 1955     2 Sheets-Sheet 1

Inventor:
Thomas Lock
By: Joseph R. Dwyer
Atty.

Aug. 5, 1958 T. LOCK 2,845,870
FUEL BOOSTER PUMP
Filed April 22, 1955 2 Sheets-Sheet 2
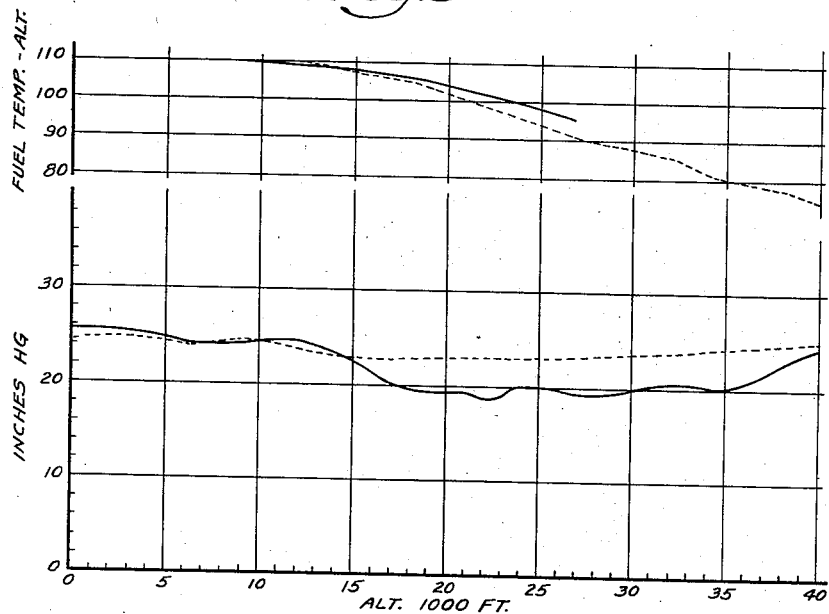
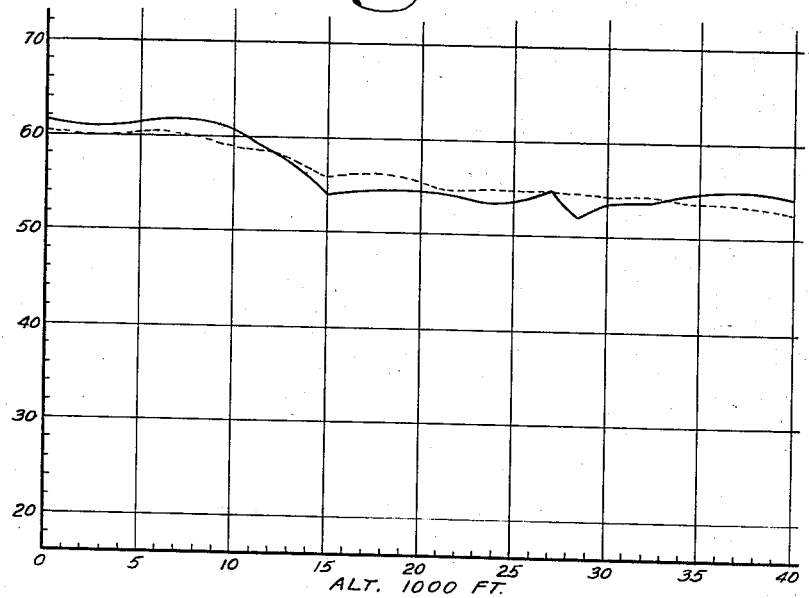
Inventor:
Thomas Lock
By: Joseph R. Dwyer
Atty.

United States Patent Office 2,845,870
Patented Aug. 5, 1958

2,845,870

FUEL BOOSTER PUMP

Thomas Lock, Parma, Ohio, assignor to Borg-Warner Corporation, Chicago, Ill., a corporation of Illinois Application April 22, 1955, Serial No. 503,201

1 Claim. (Cl. 103—113)

This invention relates in general to the pumping of liquid, and is particularly concerned with an improvement in booster pumps for delivering highly volatile fuel from a source of said fuel, such as an aircraft tank, to an engine fuel pump or to a point of consumption such as the aircraft engine itself.

As is well-known, the vapor pressure in high octane fuel used in aircraft is relatively high and is subject to boiling or vaporization as the aircraft rises from a ground level to higher altitudes where the pressure of the surrounding air is relatively low, possibly lower than the vapor pressure of the liquid fuel, and the vapor thus formed in the fuel tank renders it exceedingly difficult to deliver fuel from the tank either in a liquid form or in the form of a liquid-vapor mixture having a low vapor content. As aircraft become more developed, as higher altitudes and faster aircraft accelerations are being required, the problem of delivering fuel to the aircraft engine becomes still more difficult.

Further study into this problem of delivering fuel under the above-mentioned difficult conditions has shown that this problem is particularly acute when aircraft are at or near the altitudes of 15,000 to 20,000 feet which are the altitudes that fuel usually starts to boil, depending, of course, on the characteristics of a particular fuel and its temperature. It is at these altitudes that the efficiency of prior art booster pumps falls off considerably.

Accordingly, my present invention seeks as its primary object an improvement in the efficiency of the booster pumps at all altitudes and particularly those altitudes where the fuel in the aircraft tank is at or near its initial boiling temperature and pressure.

As an illustration of one type of fuel booster pump in which my present invention may be applied, I will describe the same as applied in connection with my new and improved mixed flow booster pump described and claimed in my co-pending patent application, Serial No. 466,562 filed November 3, 1954, entitled "Mixed Flow Pump." It will be understood, however, that the description of my present invention as applied to my mixed flow booster pump is solely for the purpose of illustration, as my present invention may be adapted in any pump where vapor removal is required.

My new and improved fuel booster pump, as set forth in my co-pending application, is capable of pumping fuel, usually a mixture of liquid and vapor from any fuel container, more particularly, however, wing tanks of aircraft, to an external or an internal discharge line for ultimate use by aircraft engines. As further explained in my co-pending application, by providing in a fuel booster pump housing an improved impeller having a plurality of vanes or blades so positioned and proportioned to effectively cooperate with the vapor-laden fuel and so positioned and proportioned to define therebetween passages of diminishing cross-sectional areas at increasing distances from the axis of rotation, the liquid-vapor mixture of fuel, as it is drawn and forced through the pumping chamber is also subject to continually increasing pressure and continual condensation which reduces the vapor content of the liquid vapor-mixture.

Now, as set forth above, to improve the efficiency of booster pumps and to accomplish the primary object of my present invention by further reducing the vapor content of the mixture, as it is discharged from the impeller, vent means are provided in the housing assembly and so disposed that vapor located in the discharge scroll of the impeller housing will be vented back to the tank or to any zone of pressure lower than discharge pressure.

As a further refinement in the improvement of fuel booster pumps of the type herein described, I further provide in the area behind the impeller additional means for venting any trapped vapor, which might be located behind the impeller, to a zone of pressure lower than discharge pressure such as the fuel tank since it has been found that any trapped vapor behind the impeller may percolate as the aircraft climbs in altitude and increase to a pressure level which might be higher than the pressure existing in the discharge scroll and force vapor into the scroll itself, obviously interfering with the proper function of the pump.

In general, therefore, my present invention has for its broad aspects a provision of an improved construction of a fuel booster pump incorporating a new and improved mode of co-action between the housing, the impeller and the fluid moved thereby, whereby the fuel being handled will have a reduced vapor content as it is delivered to a point of consumption.

Still another object of my present invention is the provision of vent means in a fuel booster pump which communicates any undesirable vapor found in the discharge scroll back to the source of fuel or to a zone of low pressure.

Still another object of my invention is the provision of vent means in a fuel booster pump which communicates any trapped vapor behind the impeller back to the source of fuel or to a zone of low pressure.

Still another and more specific object of my present invention is the provision of a new and improved construction of a fuel booster pump which reduces the vapor content of the fuel through compression and condensation and having incorporated therein still further means of reducing the vapor content of the fuel as discharged to be delivered to a point of consumption.

Still another and more specific goal of my invention is to provide a new and improved fuel booster pump incorporating a means of still further reducing the vapor content of the fuel being discharged and which is particularly effective at the temperatures and pressures where the fuel is in its boiling stage which heretofore has been seriously detrimental to the proper functioning of fuel booster pumps.

Figure 2:
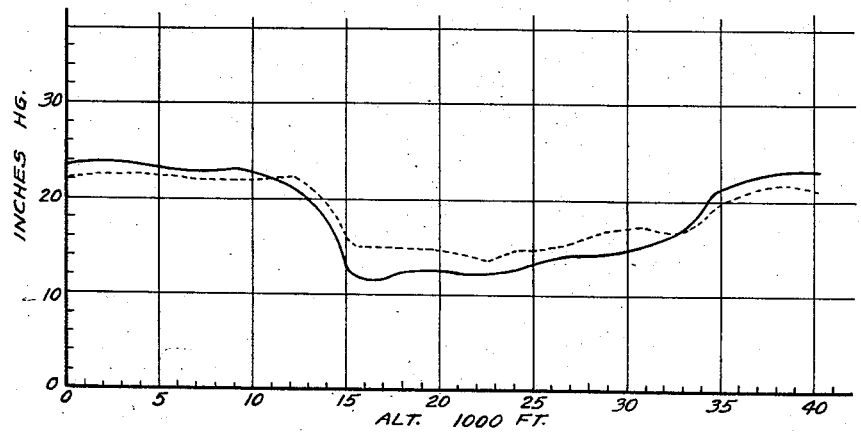
Figure 5:
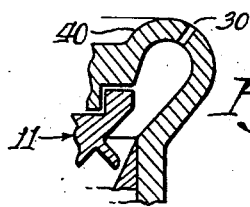

Other and more particular objects, advantages and uses of my present invention will become more apparent from the reading of the specification taken in connection with the accompanying drawings which form a part hereof and wherein:

Figure 1 is an elevational view, partially broken away, disclosing a booster pump assembly adapted for mounting submerged in a wing tank and showing to advantage a preferred form of my venting means incorporated therein in accordance with the teachings of my present invention;

Figure 2 presents curves showing the relationship of altitude and pressure for an undesignated fuel flow schedule indicating the improved performance of my present invention as incorporated in an actual model pump;

Figure 3 presents still other curves showing the relationship of altitude and pressure for an undesignated fuel flow schedule indicating the improved performance of my present invention incorporated in another actual model of a fuel pump;

Figure 4 presents still other curves showing the relationship of altitude and pressure for an undesignated fuel flow schedule indicating the improved performance of my present invention incorporated in still another actual model of a fuel pump; and Figure 5 is an elevated view, partially broken away, disclosing to advantage a booster pump assembly having a preferably designed scroll and having my venting means incorporated therein in accordance with the teaching of my present invention.

The drawings are to be understood to be more or less of a schematic character for the purpose of disclosing and illustrating a particular or preferred form of my invention like references identifying the same part in the several views.

Referring in greater detail to the figures of the drawings, in the one embodiment shown in Figure 1 thereof, there is depicted a fuel booster pump assembly typically installed submerged in an aircraft fuel tank on the bottom of or on the lower side thereof. This booster pump assembly comprises generally a housing 10 having an impeller, indicated in its entirety by numeral 11, suitably affixed to the lower end of shaft 12 which, in turn, is rotatably driven in the usual manner by remotely controlled electric motor 13. When the booster pump assembly is operatively installed in the manner shown, the complete assembly is positioned by a mounting flange 14 specifically designed for that purpose to afford free gravity flow of liquid vapor from the tank to the impeller. Fuel entering the booster pump assembly from the tank, passes through screen 15, mounted about the lower portion of the housing and moves at first radially inwardly past inlet guide vanes 16 then upwardly into inlet throat 17 to be discharged by the impeller 11 into the surrounding scroll or volute chamber 18 which discharges into the usual outlet 20 arranged to be connected with an external or internal fuel line to a point of consumption (not shown).

The housing 10 with its inlet throat 17 is specially formed for cooperation with the specially formed spirally extending vanes 21 and channels or grooves 22 formed therebetween on the impeller 11. These spirally extending channels or grooves are given a smooth, substantially rectangular contour, the open portions of these channels being in closely spaced relation to the conically formed wall surface 23 in the housing 10. The leading edges 24 of the vanes 21 lie adjacent to or within the throat 17 and are formed to cooperate with the fuel entering the throat 17 as more fully explained in my copending application, above identified. When the impeller 11 is rotated, it can be seen that the liquid-vapor mixture of fuel which enters the throat 17 is carried spirally upwardly and outwardly in the channel 22 to discharge into the scroll 18 as aforesaid.

More specifically, it can be seen in Figure 1 that rotation of the impeller 11 by the shaft 12 will subject the liquid-vapor mixture in the throat 17 to the action of the leading edge 24 of vanes or blades 21 and it is important to note that as the fuel is being carried from the leading edges 24 of the blades or vanes 21 by the substantially rectangular grooves or passages 22, that the cross-sectional contour of the passages 22 becomes increasingly smaller presenting an increasingly diminishing area to the fuel flow so carried in such a manner that pressure is imposed upon the fuel in its spirally axial travel from the throat 17 until it is discharged into the scroll 18. Particular attention is also directed, in the embodiment shown, to the angular inclination of the cone-shaped hub 25 with respect to the rotational axis of the impeller as compared to the angular inclination of the cone-shaped side wall 23 of the housing with respect to this same axis. This shows very clearly the decrease in cross-sectional areas at increasing distances from the axis of rotation of substantially rectangular passages 22 with resultant increase in pressure imposed upon the liquid-vapor mixture being pumped. This increase in pressure not only imparts compression but also results in the condensation of the vapor of the liquid-vapor mixture as apparent from the more theoretical discussion of the embodiment of my invention described and claimed in my co-pending application, above-identified, and which, as mentioned therein, is one explanation of the improved performance of my booster pump over the performance of prior booster pumps of the centrifugal type.

Briefly, the explanation set forth in my co-pending application is substantially as follows. It is well-known that highly volatile fuel, such as that being handled by my invention, forms vapors at low pressure and elevated temperature causing a change of phase in the fuel, that is, fuel in its liquid form becomes a mixture of liquid and vapor at higher temperatures and lower pressures. Now, in order to pump fuel in the liquid state or in the state of a mixture having the desired lower vapor-to-liquid ratio from an initial vapor mixture having an unduly high percentage of vapor, it is desirable to increase the pressure of the liquid-vapor mixture without appreciably changing its temperature. Under these circumstances, a new condition or state of the fuel caused by this increase in pressure without an appreciable change in temperature, demands a reduction in vapor content of the liquid-vapor mixture. In other words, in the process of changing the state of the fuel, the occluded vapors are compressed and the temperatures of the fuel at this higher pressure has not increased appreciably—thus, the mixture is at a lower temperature value than that at which the initial ratio of vapor-to-liquid of the mixture can be maintained—an unstable condition whereby the vapor condenses to establish a new state of the fuel.

The above explanation describes the action or cooperation of my impeller with the fuel being handled, and this cooperation will continue to change the state of the fuel to raise the pressure of the liquid-vapor mixture without appreciably changing its temperature and a new stable condition will continue to form by compression and condensation.

Obviously, as the pressure of the atmosphere decreases with altitude, the state of the fuel in the tank increases in vapor content which makes the duty required of my impeller more severe. This severity of duty will continue to increase with higher altitudes until the vapor content of the liquid-vapor mixture has increased sufficiently within the blade passages themselves to cause mal-functioning and/or complete failure of the impeller to pump any fuel at all. In other words, my impeller having the above described compression-condensation action near the inlet of the impeller or just within the blade passages, and will continue to function until the pressure developed within the impeller is insufficient to place the state of the fuel in the liquid phase or to reduce the ratio of vapor-to-liquid sufficiently. It is evident, too, that my impeller would be designed to operate within expected pressure and temperature requirements before mal-functioning or failure point is reached.

As aforesaid, it has been discovered that in operation of booster pumps that there are certain temperatures and pressures whereas the efficiency of the booster pumps falls off considerably. This critical condition has been found to exist at or near the 15,000 to 20,000 foot altitudes and has been attributed to the fact that it is at these altitudes that the fuel temperatures and the atmospheric pressure are such that the fuel begins to boil depending on the characteristics of a particular fuel. Below and above these altitudes the criticalness of operation is not so acute since the fuel characteristics are more stable.

Now, in order to improve the overall efficiency of booster pumps and particularly to increase their efficiency at the altitudes, above mentioned, which are critical to booster pump operation, I have provided in the housing still further means of reducing the vapor content of the fuel to be discharged into the external line for ultimate consumption in aircraft. It has been found that these further refinements in the construction of booster pumps have increased the efficiency at all altitudes and are particularly outstanding at the critical altitudes above mentioned.

Now, in order to explain in detail one of my refinements in booster pumps, attention is now directed to Figure 1 where it can be seen that the housing 10 having scroll 18 is additionally provided with a plurality of horizontally extending holes or passages (only two passages 30 and 31 being shown) which communicate at one end with scroll 18 and at the other end with a zone of pressure lower than discharge pressure, such as the fuel tank. These holes 30 and 31 are preferably located in the lower portion of the scroll for the particular scroll shown since it is likely that any vapor in the discharge flow from the impeller or formed on passing into the scroll will be carried to the lower portion thereof. The mixture discharged from the impeller 11 past edge 33 of the conical wall 23 will likely cause a lower pressure area in the lower portion 35 thereof. It is evident, therefore, that any vapor that may exist in the discharge scroll 18 will tend to be located in the lower portion 35 thereof and by locating passages 30 and 31 so as to communicate with the lower portion, such as shown in Figure 1, any vapors so located can be vented readily back to the fuel tank. It has been found in the practical application of my invention that four such holes, as indicated at 30 and 31, formed $\frac{1}{16}''$ in diameter, will satisfactorily perform the function required of them.

For a still further improvement in the overall efficiency of booster pumps, it can be seen clearly in Figure 1 that I have also provided the housing 10 with still further vent means in the form of holes or passages, such as 36 and 37 (only two being shown in Figure 1), which communicate at one end with a pocket 38 formed behind the impeller by shaft 12, sealing and bearing means, indicated in their entirety by 39, and impeller 11. These sealing means, as shown, are normally disposed about the shaft 12 to prevent unnecessary leakage from the impeller into the electric motor 13. Passages 36 and 37 communicate at their other ends, respectively, with a zone of pressure lower than discharge pressure, such as the fuel tank. Any leakage from the scroll 18 into the pocket 38 behind the impeller tends to vaporize and boil as the airplane climbs in altitude and often may develop a pressure higher than that in the scroll 18 with a result that vapor may be forced into the scroll causing a reduction in the efficiency of the pump. Obviously, vent means 36 and 37 will prevent the vapors formed in pocket 38 from getting into the scroll. In the practical arrangement of my invention, I have found that four of these vent means having a diameter of $\frac{1}{16}''$ will function well for the purpose intended.

Turning now to Figures 2, 3, and 4, there is presented graphical representations showing the relationship of altitude, pressure for an undesignated fuel flow schedule and including curves showing the performance of my mixed flow booster pump constructed in accordance with the teachings of my co-pending application Serial No. 466,562 together with curves showing the superior performance when said booster pumps have incorporated therein the refinements of my present invention. The solid lines represent the performance of my booster pump before the present invention have been incorporated therein and the dotted lines represent the performance of my booster pump with my present invention incorporated therein.

Attention is particularly directed in these figures so that portion of the curves between 15,000 and 20,000 feet where it can be seen that the discharge drops considerably at these altitudes. As hereinbefore explained, this drop in pressure has been found to be the altitude at which the fuel starts to boil for the particular fuel used and its temperature. By comparing the discharge pressure as represented by the dotted lines to the discharge pressure as represented by the solid lines, it can be seen that at these identified altitudes the discharge pressure, and consequently the efficiency of the pump, is considerably improved. While it is noted that in the altitudes below and above the critical altitudes there is a slight decrease in output pressure, it has been found in practice that this is not detrimental since the efficiency of my pump at these altitudes is higher than that required.

In this connection, attention is particularly directed to Figures 3 and 4 where it can be seen that incorporating my present invention the discharge pressure is such that it tends to be a straight line indicating substantially uniform discharge pressure at all altitudes—the desired result in any booster pump.

Turning now to Figure 5, it can be seen that vent holes or passages (only hole 30 being shown) are formed in another discharge scroll which differs in shape from that shown in Figure 1. The scroll, thus formed, allows more even distribution of pressure, nontheless vapors still tend to form at areas of low pressure, which are areas of lowest velocity of the discharged fuel and my present invention is equally applicable hereat. As shown in Figure 5, these vent holes communicate with the highest portion or area of scroll 40 which is the area of lowest velocity and pressure to vent any vapor back to the tank or any zone of lower pressure.

As can be seen from the above description, my present invention is an efficient and commercially practical design which effectively cooperates with the fuel being handled not only to further reduce any vapor found in the discharge portion of the pump but also to release the vapor found behind the impeller which might be detrimental to the practical operation of booster pumps. It is to be understood that the proper selection of blade shapes and sizes, the proper disposition of these blades in a selected housing to cooperate with the adjacent side walls of the pumping chamber, and proper selection of pitch of the blade and rotation of the impeller will result in outstanding performance. Too, any of the features set forth in my co-pending application Serial No. 466,562, such as the angular approach of the leading edges of the blades to the fuel in the throat 17 or the cylindrical outer diameter of the impeller itself, can be selected consonant with the teachings in that application. In addition, features of my present invention are equally applicable to a double impeller booster pump as disclosed and claimed in my copending application Serial No. 474,678 filed December 13, 1954.

It will be understood in addition that many changes and modifications may be made herein without departing from the spirit or scope of my invention and that my invention is designed and comprehended within the appended claim which should be given the scope consistent with the prior art.

I claim:

A mixed flow booster pump assembly comprising means including a conically formed wall defining a housing having an impeller chamber, an inlet leading to and a discharge scroll leading from said impeller chamber, said conically formed wall having a sharp annular ridge projecting into said scroll, an impeller received in said chamber having a sealing and bearing means adjacent said scroll and chamber, said impeller defining with said impeller chamber a plurality of passages of diminishing cross-sectional areas from inlet to discharge scroll whereby fluid in the form of a mixture of vapor and liquid having an initially high vapor content at the inlet is moved through said passages upon rotation of said impeller and is discharged past said sharp ridge into said discharge scroll in the form of a liquid or in the form of a mixture having a low vapor content, means defining at least one aperture located in said discharge scroll opposite said sharp ridge where said mixture has its highest vapor content for venting said discharge scroll to a zone of pressure lower than that in said discharge scroll for further reducing the vapor content of the mixture in said discharge scroll, and means between said impeller and said sealing and bearing means venting any undesirable trapped vapor in said assembly to a zone of pressure lower than that in said discharge scroll.

References Cited in the file of this patent

UNITED STATES PATENTS

| | | |
|---|---|---|
| 2,216,542 | Paige | Oct. 1, 1940 |
| 2,300,689 | Nagle | Nov. 3, 1942 |
| 2,461,865 | Adams | Feb. 15, 1949 |
| 2,463,251 | Curtis | Mar. 1, 1949 |
| 2,477,079 | Mueller | July 26, 1949 |
| 2,581,828 | Adams | Jan. 8, 1952 |
| 2,653,546 | Marlow | Sept. 29, 1953 |
| 2,660,120 | Edwards | Nov. 24, 1953 |
| 2,693,148 | Doelter | Nov. 2, 1954 |
| 2,704,516 | Mock et al. | Mar. 22, 1955 |
| 2,761,393 | Di Stefano et al. | Sept. 4, 1956 |

FOREIGN PATENTS

| | | |
|---|---|---|
| 9,799 | Great Britain | Aug. 28, 1913 |